United States Patent
Burdette

(10) Patent No.: US 8,660,920 B2
(45) Date of Patent: Feb. 25, 2014

(54) MANAGED DEPOSIT PROGRAM

(75) Inventor: William R. Burdette, South Miami, FL (US)

(73) Assignee: New Affinity Concepts Corp., Miami, FL (US)

(*) Notice: Subject to any disclaimer, the term of this patent is extended or adjusted under 35 U.S.C. 154(b) by 671 days.

(21) Appl. No.: 11/204,494

(22) Filed: Aug. 16, 2005

(65) Prior Publication Data

US 2007/0043666 A1 Feb. 22, 2007

(51) Int. Cl.
*G06Q 40/00* (2012.01)

(52) U.S. Cl.
USPC ............. 705/35; 705/36 R; 705/37; 705/38; 705/39; 705/43; 705/44

(58) Field of Classification Search
USPC ................................................. 705/15–45
See application file for complete search history.

(56) References Cited

U.S. PATENT DOCUMENTS

| | | | | |
|---|---|---|---|---|
| 4,232,367 A * | 11/1980 | Youden et al. | | 705/38 |
| 4,597,046 A | 6/1986 | Musmanno et al. | | |
| 4,751,640 A | 6/1988 | Lucas et al. | | |
| 5,631,828 A * | 5/1997 | Hagan | | 705/4 |
| 5,926,792 A | 7/1999 | Koppes et al. | | |
| 6,044,352 A | 3/2000 | Deavers | | |
| 6,336,102 B1 | 1/2002 | Luskin et al. | | |
| 6,374,231 B1 * | 4/2002 | Bent et al. | | 705/36 R |
| 6,513,020 B1 | 1/2003 | Weiss et al. | | |
| 7,206,761 B2 * | 4/2007 | Colvin | | 705/35 |
| 7,509,286 B1 * | 3/2009 | Bent et al. | | 705/39 |
| 7,536,350 B1 * | 5/2009 | Bent et al. | | 705/39 |
| 8,234,188 B1 * | 7/2012 | Phillips et al. | | 705/30 |
| 8,352,342 B1 * | 1/2013 | Bent et al. | | 705/35 |
| 8,498,933 B1 * | 7/2013 | Bent et al. | | 705/39 |
| 2002/0091637 A1 * | 7/2002 | Bent et al. | | 705/40 |
| 2002/0188564 A1 * | 12/2002 | Star | | 705/42 |
| 2003/0023529 A1 * | 1/2003 | Jacobsen | | 705/35 |
| 2003/0135437 A1 * | 7/2003 | Jacobsen | | 705/35 |
| 2003/0200174 A1 * | 10/2003 | Star | | 705/42 |
| 2004/0039674 A1 * | 2/2004 | Coloma | | 705/36 |
| 2005/0044038 A1 * | 2/2005 | Whiting et al. | | 705/39 |
| 2005/0114246 A1 * | 5/2005 | Coloma | | 705/35 |
| 2006/0212385 A2 * | 9/2006 | Bent et al. | | 705/38 |

OTHER PUBLICATIONS

Division (Mathematics); Wikipedia; Sep. 10, 2013.*

* cited by examiner

*Primary Examiner* — Hai Tran
(74) *Attorney, Agent, or Firm* — Mark Terry

(57) ABSTRACT

A method and machine readable storage for an enhanced return federally insured deposit program. A banking method consistent with the present invention can include receiving deposits from multiple customers into a custody account at a bank for enabling management of the received deposits by an administrator of the deposits. The received deposits can be distributed into corresponding custody accounts at a multitude of different issuer banks. In this regard, the distribution of the received deposits can be managed to maintain an agreed upon minimum level of deposits at different contracted issuer banks.

12 Claims, 2 Drawing Sheets

MANAGED DEPOSIT PROGRAM

BACKGROUND OF THE INVENTION

1. Statement of the Technical Field

The present invention relates to the field of investment and deposit funding, and more particularly to the management of agreed upon minimum levels of large deposits in Federal Deposit Insurance Corporation (FDIC) insured banks and savings and loan institutions.

2. Description of the Related Art

Under United States banking law, a bank deposit is supported by the full faith and credit of the United States Government so long as the amount of the deposit in the bank does not exceed the Federal deposit insurance limit of one-hundred thousand dollars ($100,000). The Federal Deposit Insurance Corporation ("FDIC") is a federal governmental entity charged with implementing the foregoing guarantee by providing insurance for deposits in all Federal and State licensed banks and savings institutions in the United States. Generally, bank deposits are insured by the FDIC Bank Insurance Fund ("BIF") and the deposits of savings institutions are insured by the FDIC Savings Association Insurance Fund ("SAIF").

The law and resulting administrative regulations governing the insurance of deposits within banking institutions insured by the BIF and the SAIF are identical. In both cases, the FDIC bases insurance coverage on the concept of ownership rights and capacities. Specifically, funds held in different ownership categories are insured separately from each other, and funds of the same ownership but held in different accounts are subsumed under the same insurance coverage. Regardless, the amount of insurance covered provided to depositors of each institution insured by BIF and SAIF is the same: $100,000 to the owner(s) of the funds in the account(s), including principal and interest.

As a result of the FDIC structure of insurance, investors holding funds which substantially exceed the $100,000 FDIC insurance limit generally do not utilize the bank deposit vehicle. In particular, investors holding funds which exceed $100,000 avoid cash deposits because the amount of funds which exceed the $100,000 limit must be distributed across so many different banks so as to render the exercise burdensome in establishing the accounts and even more burdensome in maintaining the different accounts.

To address the foregoing deficiencies of the banking system, U.S. patent application Ser. No. 10/326,937 entitled Certificate of Deposit Agency Portfolio System and Method by Jorge H. Coloma (hereinafter, the "CDAP System"), teaches a computerized system for managing the distribution of large deposits across multiple banks in order to facilitate deposits by large institutional sources of capital while maintaining FDIC insurance for the $100,000 elements of the deposit. So much has been legally confirmed by the FDIC that the CDAP System would allow for the "pass through" of FDIC insurance to depositors.

However, for large institutional short term (money market) deposits, since the funds must remain available for withdrawal at any time on demand, and carry a higher, more competitive rate of interest required for institutional investors, normal deposit structures under the CDAP System are not generally attractive to a large number banks. In order to make the CDAP System for institutional deposits acceptable to a large number of banks, the deposits must be managed in such a way so as to enable the offering of a longer term commitment of funds to bank issuers. The longer term commitment of funds to a bank issuer would render the deposits more attractive since the deposits would be more reliable and the bank could achieve a greater "time value of money" in order to justify the payment of a higher rate of return than ordinarily provided for short term funds.

SUMMARY OF THE INVENTION

The present invention addresses the deficiencies of the art in respect to large, short-term deposits and provides a novel and non-obvious method, system and apparatus for producing an enhanced return for federally insured, short-term deposits. In this regard, the present invention provides a system for administering large deposits applied to a multitude of banks in a manner that will assure the banks of a continuous source of deposits over a chosen period of time, for example one to three years. The banks can be assured of a continuous source of deposits even though the deposited funds are held as money market funds.

The administrator of the deposits in the system, having the right under the terms of its agreement with depositors to reposition deposits at any bank that is "qualified" in accordance with FDIC standards, can offer to selected banks agreeing to provide a higher rate of interest, an agreement to manage the support of a specified "committed" deposit level at the bank. The administrator can fulfill its contractual obligation by applying requests for withdrawals to deposits held at other banks and moving funds from other banks which have not agreed to pay the higher rate of interest in order to obtain the managed deposit commitment from the administrator. Thus, the amounts of all funds deposited in all banks in the administrator's network, can be used to support the administrator's commitment to maintain the committed balance at the contracted banks.

A banking method consistent with the present invention can include receiving deposits from multiple customers into a custody account at a bank for enabling management of the received deposits by an administrator of the deposits. The received deposits can be distributed into corresponding custody accounts at a multitude of different issuer banks. In this regard, the distribution of the received deposits can be managed to maintain an agreed upon level of aggregate deposits with different issuer banks in order to receive from the different issuer banks an enhanced interest rate payable on the aggregate deposits under the terms of an agreement between the administrator and issuer banks that desire such assurance (the "Contracted Issuer Banks").

The method further can include receiving depositor instructions for a withdrawal of funds and executing a two stage process. In response, in a first stage, it can be determined whether the withdrawal of funds could cause aggregate deposit level in any of the Contracted Issuer Banks to fall below the agreed upon level of deposits for any such Contracted Issuer Bank. If it is determined in the first stage of processing that the withdrawal of funds could cause deposit levels in any Contracted Issuer Bank to fall below the agreed upon level of aggregate deposits as a second stage of processing, other deposits managed by the administrator and held at other issuer banks can be redistributed to maintain the agreed upon level of aggregate deposits at the Contracted Issuer Banks.

The method yet further can include monitoring the issuer banks to ensure that each of the issuer banks is qualified by the administrator's standards which can include a reference to financial ratios reported to the FDIC, which determine whether the issuer bank is "well-capitalized" by FDIC standards. For each individual one of the issuer banks, the receiving, distributing and managing steps can continued to be performed only so long as the individual one of the issuer banks remains qualified (optionally, subject to a grace period for correcting any failure to remain qualified). Finally, the method yet further can include a "penalty" to the administrator in the form of a reduction in the interest rate on the deposits to the extent that the administrator fails to maintain the level of aggregate deposits agreed to with the Contracted Issuer Bank.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

To achieve an enhanced interest rate while maintaining FDIC insured status, this invention provides, through a two stage managed account system structure Stage 1 of which system structure includes: (1) a system for managing a plurality of accounts for multiple clients through a custodial bank which holds all of the funds for the insured deposit accounts, (2) providing a database having client information for each client's account, (3) administering clients' deposits into and withdrawals out of each of their respective accounts, (4) reviewing on a daily basis the net effect of deposits and withdrawals from all accounts in order to manage the level of deposits at those banks which have entered into an agreement to obtain "managed" deposits. Stage 2 of the system structure includes: (1) using the determination of the net effect of daily transactions to maintain a committed level of deposits at a Contracted Issuer Bank by withdrawing deposits from other banks (non-Contracted Issuer Banks) to redirect those deposit funds into the Contracted Issuer Bank since the administrator has made a commitment to maintain a certain level of deposits at that bank, and (2) updating the database for each client's deposits once the redistribution has been made in order to maintain customer data required to support the FDIC insured status.

Figure 1:
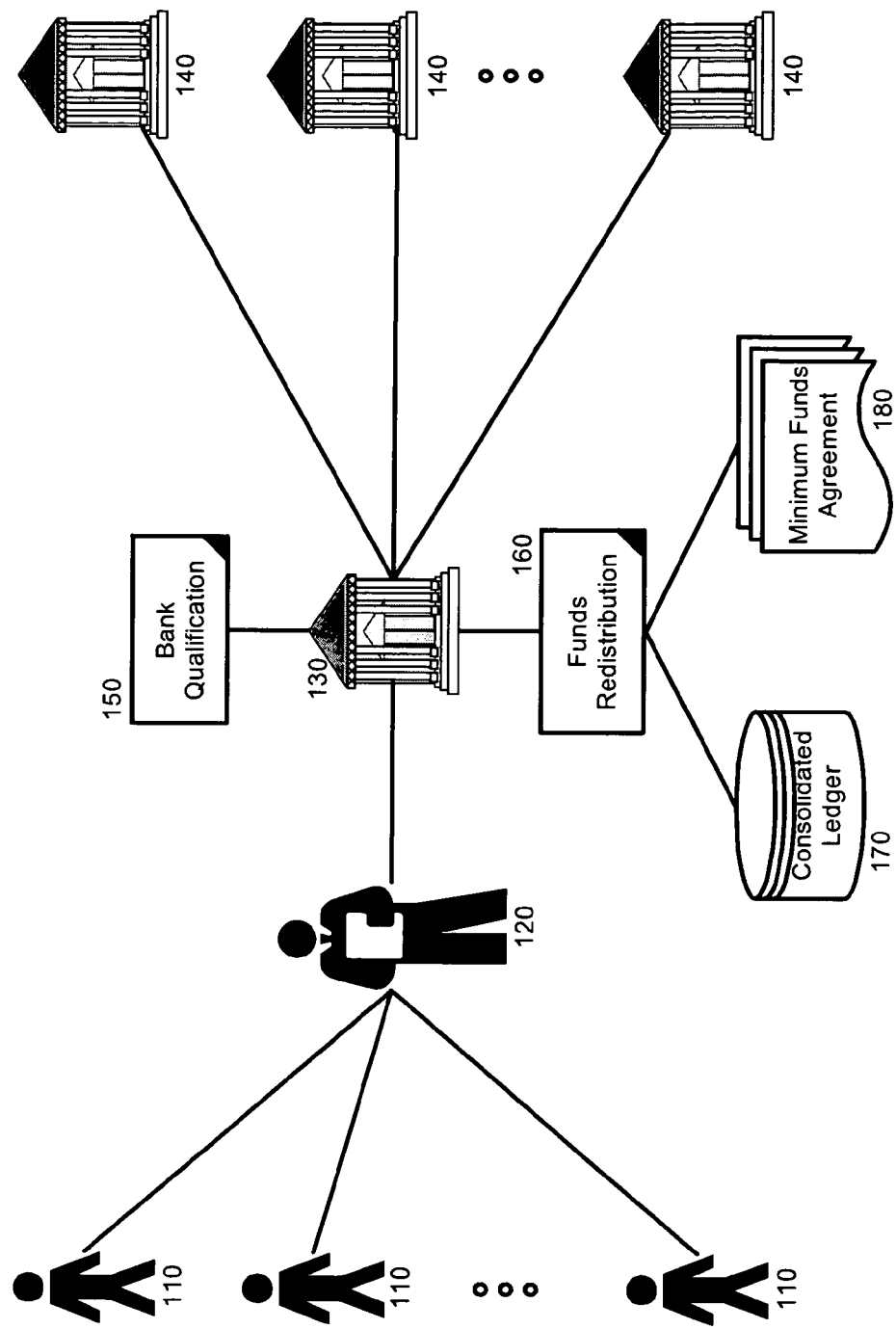
FIG. 1 is a schematic illustration of a system, method and apparatus for producing an enhanced return for federally insured deposits across multiple depositor banks; and, FIG. 2 is a flow chart illustrating a process for producing an enhanced return for federally insured deposits across multiple depositor banks.

In more particular illustration, FIG. 1 is a schematic illustration of a system, method and apparatus for producing an enhanced return for federally insured deposits across multiple depositor banks. The system can include a program administrator 120 associated with one or more custodial banks 130. The custodian bank 130 can be configured to accept deposits by depositors 110 with the understanding and agreement of the depositors 110 that the program administrator 120 will be responsible for directing with which banks deposits are placed, subject to any particular rules, limitations or conditions made by the investor.

The program administrator 120 further can have a contractual relationship with multiple FDIC qualified banks 140. In this regard, the program administrator 120 can repeatedly over time confirm the qualification of the banks 140 through a bank qualification process 150. Generally, the bank qualification process 150 can ensure that each of the banks 140 is "well-capitalized" under the FDIC guidelines. Importantly, the contractual relationship for any bank 140 can be memorialized in a minimum funds agreement 180. The minimum funds agreement 180 can specify the level of deposits agreed to be maintained for a particular bank 140 and the interest rate to be paid on the deposited funds resulting from the contractual obligation of the program administrator 120 to maintain the minimum level of deposits.

The program administrator 120 can further maintain a consolidated ledger of deposits 170 for the depositors 110 which can include records indicating the deposit amounts for each depositor 110, and the bank (or series of banks) 140 holding portions of the deposits as custodian for the depositors. The Stage 2 funds redistribution process can refer to both the consolidated ledger 170 and the minimum funds agreement 180 in order to manage deposit and withdrawal requests by the depositors 110 while maintaining optimal balances in each of the banks 140 according to each of the minimum funds agreement 180 for each of the banks 140 and the requirement that all of the deposits for the individual depositors 110 are to remain FDIC insured.

Figure 2:
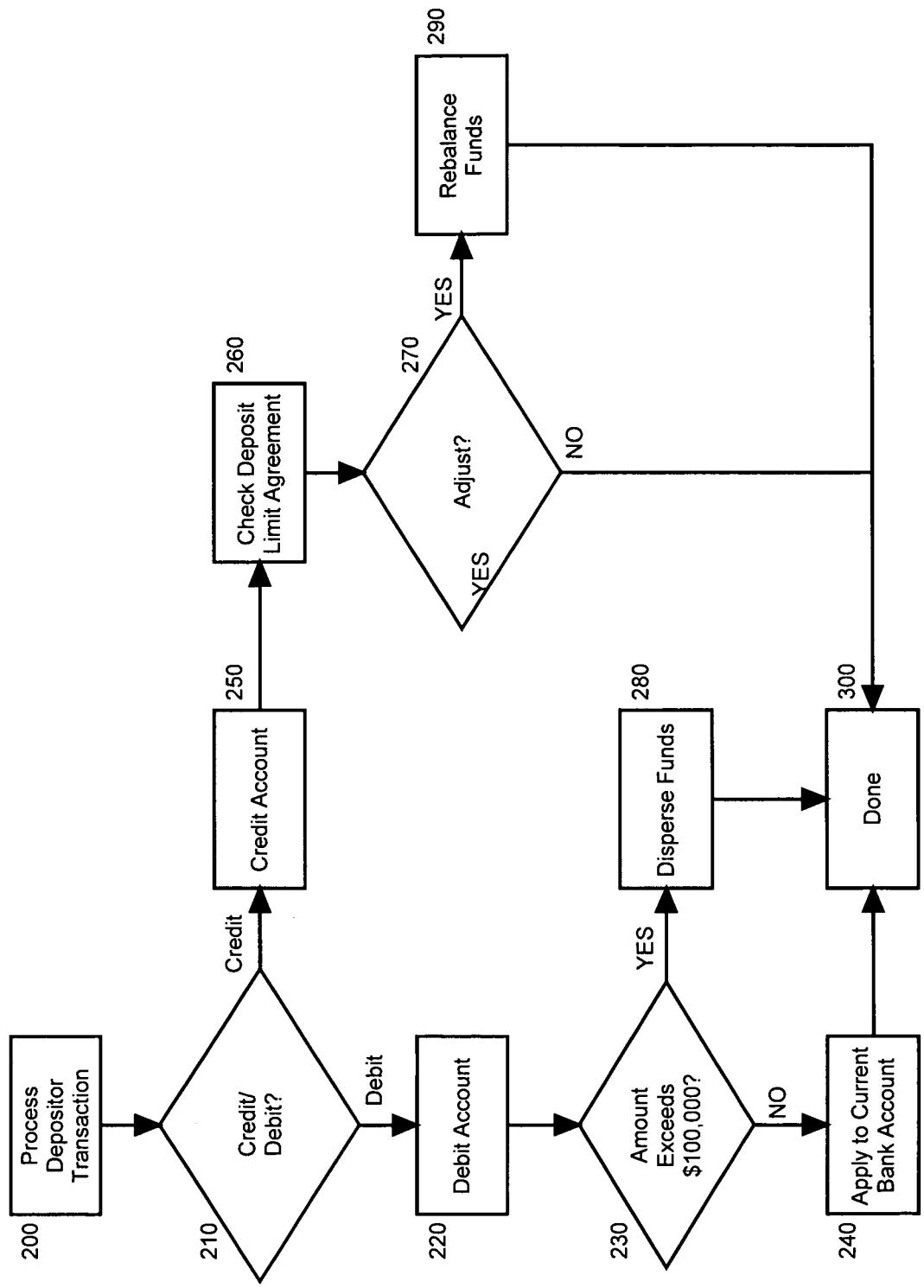

In more specific illustration of the operation of the funds redistribution process 160, FIG. 2 is a flow chart illustrating a process for producing an enhanced return for federally insured deposits across multiple depositor banks. Beginning in block 200, a depositor can initiate a transaction through the custodian bank. The transaction can include a deposit or a withdrawal. In response to the transaction, in decision block 210, it can be determined whether the transaction is a deposit (debit) or withdrawal (credit).

In the event that the transaction is a debit, in block 220, the account for the depositor can be debited by the transaction amount. Additionally, in decision block 230 it can be determined whether the transaction amount results in the total deposits for the depositor in the account exceeding the FDIC insurance limit. If not, in block 240 the transaction amount can be applied to the currently designated account and the process can end in block 300. Otherwise, in block 280, the remaining funds can be dispersed among additional accounts and different banks to ensure that the funds for the depositor do not exceed the FDIC insurance limit at any one bank.

Returning now to decision block 210, if the transaction is determined to be a withdrawal resulting in a crediting of the account of the depositor in block 250, in block 260 the deposit limit agreements for the banks holding the underlying funds of the depositor can be inspected to identify the agreed upon minimum deposit levels. Based upon the inspection, in decision block 270 as the Stage 1 processing it can be determined whether crediting of funds will result in any bank having deposits which fall below the agreed upon minimum deposit levels. If not, the process can end in block 300. Otherwise, in block 290 as the Stage 2 processing the funds held by the different banks can be rebalanced to meet the considerations of the agreements while maintaining FDIC insurance on all deposits. In this regard, the considerations can include ensuring that the banks agreeing to the most enhanced interest rates for deposits hold deposits which exceed the minimum agreed upon deposit levels.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method on a computer for managing deposits so as to maintain minimum levels of deposit with contracted issuer banks, comprising:

storing, in a database, ledger data that defines deposit amounts for each of a plurality of depositors and the identities of one or more banks wherein said deposit amounts are being held;

storing, for one or more contracted issuer banks, a minimum funds agreement that defines a minimum level of deposit for a contracted issuer bank and an interest rate to be paid on deposits in said contracted issuer bank, when said minimum level of deposit is maintained;

receiving from a first customer a deposit amount for deposit in a first customer account at a first contracted issuer bank;

determining, by the computer, whether said deposit amount may be deposited in the first customer account without exceeding governmental deposit insurance limits, and if so, a) depositing said deposit amount in the first customer account and b) storing, in the database, ledger data that reflects said depositing step, wherein if depositing said deposit amount in the first customer account would result in exceeding governmental deposit insurance limits, then a) depositing said deposit amount in another customer account that does not result in exceeding governmental deposit insurance limits, and b) storing, in the database, ledger data that reflects said depositing step;

receiving from a first customer a request for a withdrawal amount from the first customer account at the first contracted issuer bank;

accessing the minimum funds agreement for said first contracted issuer bank; and determining, by the computer, whether withdrawing said withdrawal amount from the first customer account would result in violation of the minimum level of deposit at the first contracted issuer bank, as defined in the minimum funds agreement that was accessed, and if so, a) withdrawing said withdrawal amount from the first customer account, b) withdrawing a corresponding amount from another bank, wherein said corresponding amount equals an amount of funds necessary to meet the minimum level of deposit at the first contracted issuer bank, c) depositing said corresponding amount in the first contracted issuer bank to meet the minimum level of deposit at the first contracted issuer bank, and d) storing, in the database, ledger data that reflects said withdrawing and depositing steps, wherein if withdrawing said withdrawal amount from the first customer account would not result in violation of the minimum level of deposit at the first contracted issuer bank, then a) withdrawing said withdrawal amount from the first customer account, and b) storing, in the database, ledger data that reflects said withdrawing and depositing step.

2. The method of claim 1, further comprising the step of monitoring said contracted issuer banks to ensure that each of said banks meets predefined capitalization standards.

3. The method of claim 2, further comprising the step of determining whether a minimum level of deposit, as defined in a corresponding minimum funds agreement, is met at each of said contracted issuer banks, and if not, lowering the interest rate to be paid on deposits in said contracted issuer bank, as defined in the corresponding minimum funds agreement.

4. The method of claim 3, wherein said another bank refers to a non-contracted issuer bank.

5. A computer system for managing deposits so as to maintain minimum levels of deposit with contracted issuer banks, the computer system comprising a processor configured for:

storing, in a database, ledger data that defines deposit amounts for each of a plurality of depositors and the identities of one or more banks wherein said deposit amounts are being held;

storing, for one or more contracted issuer banks, a minimum funds agreement that defines a minimum level of deposit for a contracted issuer bank and an interest rate to be paid on deposits in said contracted issuer bank, when said minimum level of deposit is maintained;

receiving from a first customer a deposit amount for deposit in a first customer account at a first contracted issuer bank;

determining, by the computer, whether said deposit amount may be deposited in the first customer account without exceeding governmental deposit insurance limits, and if so, a) depositing said deposit amount in the first customer account and b) storing, in the database, ledger data that reflects said depositing step, wherein if depositing said deposit amount in the first customer account would result in exceeding governmental deposit insurance limits, then a) depositing said deposit amount in another customer account that does not result in exceeding governmental deposit insurance limits, and b) storing, in the database, ledger data that reflects said depositing step;

receiving from a first customer a request for a withdrawal amount from the first customer account at the first contracted issuer bank;

accessing the minimum funds agreement for said first contracted issuer bank; and determining, by the computer, whether withdrawing said withdrawal amount from the first customer account would result in violation of the minimum level of deposit at the first contracted issuer bank, as defined in the minimum funds agreement that was accessed, and if so, a) withdrawing said withdrawal amount from the first customer account, b) withdrawing a corresponding amount from another bank, wherein said corresponding amount equals an amount of funds necessary to meet the minimum level of deposit at the first contracted issuer bank; c) depositing said corresponding amount in the first contracted issuer bank to meet the minimum level of deposit at the first contracted issuer bank, and d) storing, in the database, ledger data that reflects said withdrawing and depositing steps, wherein if withdrawing said withdrawal amount from the first customer account would not result in violation of the minimum level of deposit at the first contracted issuer bank, then a) withdrawing said withdrawal amount from the first customer account, and b) storing, in the database, ledger data that reflects said withdrawing and depositing step.

6. The computer system of claim 5, wherein the processor is further configured for monitoring said contracted issuer banks to ensure that each of said banks meets predefined capitalization standards.

7. The computer system of claim 6, wherein the processor is further configured for determining whether a minimum level of deposit, as defined in a corresponding minimum funds agreement, is met at each of said contracted issuer banks, and if not, lowering the interest rate to be paid on deposits in said contracted issuer bank, as defined in the corresponding minimum funds agreement.

8. The computer system of claim 7, wherein said another bank refers to a non-contracted issuer bank.

9. A non-transitory computer readable storage medium having stored thereon a computer program for managing deposits so as to maintain minimum levels of deposit with contracted issuer banks, the computer program comprising a routine set of instructions which when executed by a machine causes the machine to perform the steps of:

storing, in a database, ledger data that defines deposit amounts for each of a plurality of depositors and the identities of one or more banks wherein said deposit amounts are being held;

storing, for one or more contracted issuer banks, a minimum funds agreement that defines a minimum level of deposit for a contracted issuer bank and an interest rate to be paid on deposits in said contracted issuer bank, when said minimum level of deposit is maintained;

receiving from a first customer a deposit amount for deposit in a first customer account at a first contracted issuer bank;

determining, by the computer, whether said deposit amount may be deposited in the first customer account without exceeding governmental deposit insurance limits, and if so, a) depositing said deposit amount in the first customer account and b) storing, in the database, ledger data that reflects said depositing step, wherein if depositing said deposit amount in the first customer account would result in exceeding governmental deposit insurance limits, then a) depositing said deposit amount in another customer account that does not result in exceeding governmental deposit insurance limits, and b) storing, in the database, ledger data that reflects said depositing step;

receiving from a first customer a request for a withdrawal amount from the first customer account at the first contracted issuer bank;

accessing the minimum funds agreement for said first contracted issuer bank; and determining, by the computer, whether withdrawing said withdrawal amount from the first customer account would result in violation of the minimum level of deposit at the first contracted issuer bank, as defined in the minimum funds agreement that was accessed, and if so, a) withdrawing said withdrawal amount from the first customer account, b) withdrawing a corresponding amount from another bank, wherein said corresponding amount equals an amount of funds necessary to meet the minimum level of deposit at the first contracted issuer bank, c) depositing said corresponding amount in the first contracted issuer bank to meet the minimum level of deposit at the first contracted issuer bank, and d) storing, in the database, ledger data that reflects said withdrawing and depositing steps, wherein if withdrawing said withdrawal amount from the first customer account would not result in violation of the minimum level of deposit at the first contracted issuer bank, then a) withdrawing said withdrawal amount from the first customer account, and b) storing, in the database, ledger data that reflects said withdrawing and depositing step.

10. The non-transitory computer readable storage medium of claim 9, further comprising an additional set of instructions which when executed by the machine cause the machine to perform the steps of: monitoring said contracted issuer banks to ensure that each of said banks meets predefined capitalization standards.

11. The non-transitory computer readable storage medium of claim 10, further comprising an additional set of instructions which when executed by the machine cause the machine to perform the steps of: determining whether a minimum level of deposit, as defined in a corresponding minimum funds agreement, is met at each of said contracted issuer banks, and if not, lowering the interest rate to be paid on deposits in said contracted issuer bank, as defined in the corresponding minimum funds agreement.

12. The non-transitory computer readable storage medium of claim 11, wherein said another bank refers to a non-contracted issuer bank.

* * * * *